(12) United States Patent
Ragnet et al.

(10) Patent No.: US 8,566,349 B2
(45) Date of Patent: Oct. 22, 2013

(54) HANDWRITTEN DOCUMENT CATEGORIZER AND METHOD OF TRAINING

(75) Inventors: Francois Ragnet, Venon (FR); Florent C. Perronnin, Domène (FR); Thierry Lehoux, Grenoble (FR)

(73) Assignee: Xerox Corporation, Norwalk, CT (US)

(*) Notice: Subject to any disclaimer, the term of this patent is extended or adjusted under 35 U.S.C. 154(b) by 698 days.

(21) Appl. No.: 12/567,920

(22) Filed: Sep. 28, 2009

(65) Prior Publication Data

US 2011/0078191 A1    Mar. 31, 2011

(51) Int. Cl.
*G06F 17/30* (2006.01)

(52) U.S. Cl.
USPC .......................................... 707/780; 707/722

(58) Field of Classification Search
USPC ...................................................... 707/780
See application file for complete search history.

(56) References Cited

U.S. PATENT DOCUMENTS

| | | | |
|---|---|---|---|
| 5,438,630 A | 8/1995 | Chen et al. | |
| 5,825,919 A | 10/1998 | Bloomberg et al. | |
| 6,021,218 A * | 2/2000 | Capps et al. | 382/187 |
| 7,139,754 B2 | 11/2006 | Goutte et al. | |
| 7,457,808 B2 | 11/2008 | Goutte et al. | |
| 2003/0101187 A1 | 5/2003 | Gaussier et al. | |
| 2006/0193518 A1* | 8/2006 | Dong | 382/186 |
| 2007/0005340 A1 | 1/2007 | Goutte | |
| 2007/0005356 A1 | 1/2007 | Perronnin | |
| 2007/0005639 A1 | 1/2007 | Gaussier et al. | |
| 2007/0143101 A1 | 6/2007 | Goutte | |
| 2007/0239450 A1* | 10/2007 | Kienzle et al. | 704/244 |
| 2007/0239745 A1 | 10/2007 | Guerraz et al. | |
| 2007/0258648 A1 | 11/2007 | Perronnin | |
| 2008/0069456 A1 | 3/2008 | Perronnin | |
| 2008/0249999 A1 | 10/2008 | Renders | |
| 2009/0060335 A1 | 3/2009 | Serrano et al. | |
| 2009/0060396 A1 | 3/2009 | Bressan et al. | |
| 2009/0180695 A1 | 7/2009 | Serrano et al. | |
| 2009/0271433 A1* | 10/2009 | Perronnin et al. | 707/103 R |
| 2010/0067793 A1* | 3/2010 | Serrano et al. | 382/179 |

OTHER PUBLICATIONS

Agarwal, et al., *Hyperfeatures—Multilevel Local Coding for Visual Recognition*, ECCV06, 2006.
Csurka, et al., *Visual Categorization With Bags of Keypoints*, Proc. ECCV Intl. Worshop on Statistical Learning in Computer Vision, 2004.

(Continued)

*Primary Examiner* — Neveen Abel Jalil
*Assistant Examiner* — Jagdish Pandya
(74) *Attorney, Agent, or Firm* — Fay Sharpe LLP

(57) ABSTRACT

A method and an apparatus for training a handwritten document categorizer are disclosed. For each category in a set into which handwritten documents are to be categorized, discriminative words are identified from the OCR output of a training set of typed documents labeled by category. A group of keywords is established including some of the discriminative words identified for each category. Samples of each of the keywords in the group are synthesized using a plurality of different type fonts. A keyword model is then generated for each keyword, parameters of the model being estimated, at least initially, based on features extracted from the synthesized samples. Keyword statistics for each of a set of scanned handwritten documents labeled by category are generated by applying the generated keyword models to word images extracted from the scanned handwritten documents. The categorizer is trained with the keyword statistics and respective handwritten document labels.

23 Claims, 6 Drawing Sheets

(56) References Cited

OTHER PUBLICATIONS

Perronnin, et al., *Fisher Kernels for Handwritten Word-Spotting, 10th Intl. Conf. on Document Analysis and Recognition (IEEE)*, 2009.
Rodríguez-Serrano, et al., *Handwritten Word-Image Retrieval with Synthesized Typed Queries, 10th Intl. Conf. on Document Analysis and Recognition (IEEE)*, 1009.
Xerox, *CategoriX & ClusteriX, Research Centre Europe*, May 2005.
U.S. Appl. No. 11/847,742, filed Aug. 30, 2007, Bressan, et al.
U.S. Appl. No. 11/847,757, filed Aug. 30, 2007, Rodriguez Serrano, et al.
U.S. Appl. No. 12/014,193, filed Jan. 15, 2008, Rodriguez Serrano, et al.
U.S. Appl. No. 12/061,070, filed Apr. 2, 2008, Perronnin, et al.
U.S. Appl. No. 12/169,101, filed Jul. 8, 2008, Bressan, et al.
U.S. Appl. No. 12/174,721, filed Jul. 17, 2008, Renders, et al.
U.S. Appl. No. 12/212,964, filed Sep. 18, 2008, Rodriguez Serrano, et al.
U.S. Appl. No. 12/361,178, filed Jan. 28, 2009, Rodriguez, et al.
U.S. Appl. No. 12/417,110, filed Apr. 2, 2009, Privault, et al.
U.S. Appl. No. 12/479,972, filed Jun. 8, 2009, Privault, et al.

* cited by examiner

HANDWRITTEN DOCUMENT CATEGORIZER AND METHOD OF TRAINING

CROSS REFERENCE TO RELATED PATENTS AND APPLICATIONS

The following copending applications, the disclosures of which are incorporated herein in their entireties by reference, are mentioned:

U.S. application Ser. No. 12/169,101, filed Jul. 8, 2008, entitled WORD DETECTION METHOD AND SYSTEM, by Marco Bressan, et al.

U.S. patent application Ser. No. 12/212,964, filed Sep. 18, 2008, entitled HANDWRITTEN WORD SPOTTER USING SYNTHESIZED TYPED QUERIES, by Jose A. Rodriguez Serrano, et al.

BACKGROUND

The exemplary embodiment relates generally to recognition of handwritten words in document images without having to detect or identify the individual characters making up the words or the full text. It relates particularly to a document categorizer for handwritten documents which is trained on document statistics generated by identifying discriminative words in training documents using models for these words which may employ synthesized word images as training samples, and finds application in document classification, processing, analysis, sorting, detection, word spotting, and related arts.

Text of electronically encoded documents tends to be found in either of two distinct formats, namely bitmap format and character code format. In the former, the text is defined in terms of an array of pixels corresponding to the visual appearance of the page. A binary image is one in which a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where it is desirable for text to be extracted from a document or a portion thereof which is in bitmap format. For example, a document may be available only in a printed version. In the case of a mailroom, for example, documents, such as letters, often arrive in unstructured format, and for ease of processing, are classified into a number of pre-defined categories. Manual classification is a time consuming process, often requiring a reviewer to read a sufficient portion of the document to form a conclusion as to how it should be categorized. Methods have been developed for automating this process. In the case of typed text, for example, the standard solution includes performing OCR on each letter and extracting a representation of the document, e.g., as a bag-of-words (BoW) in which a histogram of word frequencies is generated. Classification of the letter can then be performed, based on the BoW histogram.

However, a significant portion of the letter flow in a mailroom is typically handwritten. To handle handwritten text, one solution would be to replace the OCR engine with a Handwriting Recognition (HWR) engine. However, this approach has at least two significant shortcomings: (i) the error rate of HWR engines is much higher than that of OCR engines and (ii) the processing time, i.e., the time it takes to obtain the full transcription of a page, is also very high (several seconds per page). When large numbers of documents are to be processed, as in the case of a mailroom, this is not a viable alternative for the handwritten letters.

"Word-spotting" methods have been developed to address the challenge of handwritten documents. Such methods operate by detecting a specific keyword in a handwritten document without the need of performing a full transcription. For example, an organization dealing with contracts may wish to identify documents which include keywords such as "termination" or "cancellation" so that such documents can receive prompt attention. Other organizations may wish to characterize documents according to their subject matter for processing by different groups within the organization.

In word spotting methods, handwritten samples of the keyword are extracted manually from sample documents and used to train a model which is then able to identify the keyword, with relatively good accuracy, when it appears in the document text. One system, based on hidden Markov models (HMMs), represents words as a concatenation of single-state character HMMs. This system employs segmentation of the characters prior to feature extraction. Another system uses multiple-state HMMs to model characters without requiring segmentation of words into characters.

One drawback which limits the usefulness of word spotting methods is that the keyword(s) for a given category need to be chosen carefully by a human operator. For some categories, a single word may be sufficient to ensure that a large proportion of the documents is identified. With other categories, finding a single word is more difficult. The problem is compounded as the number of categories increases since some keywords may be common to two or more categories. As a result, wide-spread deployment of word spotting techniques is difficult.

INCORPORATION BY REFERENCE

The following references, the disclosures of which are incorporated herein in their entireties by reference, are mentioned:

The following relate generally to word spotting methods: U.S. Pub. No. 20090060396, published Mar. 5, 2009, entitled FEATURES GENERATION AND SPOTTING METHODS AND SYSTEMS USING SAME, by Bressan, et al.; U.S. Pub. No. 2009/0060335, published Mar. 5, 2009, entitled SYSTEM AND METHOD FOR CHARACTERIZING HANDWRITTEN OR TYPED WORDS IN A DOCUMENT, by Serrano, et al.; and U.S. Pub. No. 2009/0180695, published Jul. 16, 2009, entitled ASYMMETRIC SCORE NORMALIZATION FOR HANDWRITTEN WORD SPOTTING SYSTEM, by Serrano, et al., above-mentioned U.S. application Ser. Nos. 12/169,101 and 12/212,964; U.S. application Ser. No. 12/061,070, filed Apr. 2, 2008, entitled UNSUPERVISED WRITER STYLE ADAPTATION FOR HANDWRITTEN WORD SPOTTING, by Perronnin, et al.; U.S. application Ser. No. 12/361,178, filed Jan. 28, 2009, entitled MODEL-BASED COMPARATIVE MEASURE FOR VECTOR SEQUENCES AND WORD SPOTTING USING SAME, by Rodriguez, et al.; and Florent Perronnin and Jose A. Rodriguez-Serrano, "Fisher kernels for handwritten word-spotting," in 10th International Conference on Document Analysis and Recognition (ICDAR), Barcelona, Jul. 26-29, 2009.

U.S. Pat. No. 5,438,630 to Chen, et al. and U.S. Pat. No. 5,825,919 to Bloomberg, et al. are both directed to methods for word identification which are based on features of the entire word, without the need for segmentation or OCR, and without the need to recognize non-keywords. In the method of Chen, for example, font-independent character models are created using Hidden Markov Models (HMMs) and arbitrary keyword models are built from the character HMM components. Word or text line bounding boxes are extracted from the image. A set of features based on the word shape (and optionally also the word internal structure) within each bounding box is extracted. This set of features is applied to a network that includes one or more keyword HMMs.

The following references disclose visual categorization systems: U.S. Pub. No. 2007/0005356, entitled GENERIC VISUAL CATEGORIZATION METHOD AND SYSTEM, by Perronnin; U.S. Pub. No. 2008/0069456, entitled BAGS OF VISUAL CONTEXT-DEPENDENT WORDS FOR GENERIC VISUAL CATEGORIZATION, by Perronnin; U.S. Pub. No. 2007/0258648, entitled GENERIC VISUAL CLASSIFICATION WITH GRADIENT COMPONENTS-BASED DIMENSIONALITY ENHANCEMENT, by Perronnin; A. Agarwal and B. Triggs, "Hyperfeatures—Multilevel Local Coding for Visual Recognition", ECCV06, 2006; and Csurka, Dance, Fan, Willamowski and Bray, "Visual Categorization With Bags-Of-Keypoints", Proc. ECCV International Workshop on Statistical Learning in Computer Vision, 2004.

U.S. Pub. No. 2003/0101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al., discloses clustering techniques for text data based on statistical modeling of co-occurrences of (document, word) pairs.

BRIEF DESCRIPTION

In accordance with one aspect of the exemplary embodiment, a method for training a handwritten document categorizer includes, for each of a set of categories, extracting a set of discriminative words from a training set of typed documents that are labeled by category. For each keyword in a group of keywords, a set of samples of the keyword is synthesized with a plurality of different type fonts, the keywords comprising at least one discriminative word for each category in the set of categories. A keyword model is generated for each keyword in the group, parameters of the model being estimated based on features extracted from the synthesized samples of that keyword. Keyword statistics for each of a set of scanned handwritten documents labeled by category are generated by applying the generated keyword models for the group of keywords to word images extracted from the scanned handwritten documents. A handwritten document categorizer is trained with the keyword statistics computed for the set of handwritten documents and the respective handwritten document labels. One or more elements of the method may be performed with a computer processor.

In another aspect, an apparatus for training a handwritten document categorizer includes memory which stores instructions. These include instructions which, for a set of typed documents labeled by category, identify, for each of a set of categories, a corresponding set of keywords which are discriminative for that category based on a frequency of occurrence of the keywords in the typed documents labeled with that category. Instructions are provided which, for each keyword in a group of keywords, synthesize a set of computer-generated images using different fonts. The group of keywords includes keywords from each set of the keywords. Instructions are provided for generating a keyword model for each keyword in the group of keywords, based on features extracted from the synthesized images. Instructions are provided for computing keyword statistics for each of a set of scanned handwritten documents, labeled by category, by applying the generated keyword models to word images extracted from the scanned handwritten documents. Instructions are provided for training a handwritten document categorizer with the keyword statistics computed for the set of handwritten documents and the respective handwritten document labels. A processor in communication with the memory executes the instructions.

In another aspect, a method for categorizing a handwritten test document includes OCR processing a set of scanned typed documents to identify words in each document, each typed document being labeled with a category selected from a set of categories, extracting a set of discriminative keywords for each category in the set of categories based on word frequencies of at least some of the identified words in the documents, synthesizing typed samples for each keyword in a group of keywords, the group of keywords comprising discriminative keywords from each of the sets of discriminative keywords, building one model per keyword in the group based on the typed samples, optionally, tuning parameters of each keyword model by comparing keyword statistics measured on the typed documents with detection statistics for the keyword measured by applying the model to handwritten documents labeled with the same category, and applying each of the optionally tuned keyword models to the labeled handwritten documents to identify keywords from the group of keywords occurring in the labeled handwritten documents. For each category, the method includes computing an optionally weighted bag-of-keywords histogram per handwritten document labeled with that category based on the occurrence of keywords from the group of keywords in the document, and training a classifier on the optionally weighted bag-of-keywords histograms. For a handwritten test document to be categorized, an optionally weighted bag-of-keywords histogram is computed, including applying the optionally tuned keyword models to the handwritten document. The handwritten test document is categorized with the trained classifiers.

DETAILED DESCRIPTION

One aspect of the exemplary embodiment relates to a method for training a categorizer for assigning handwritten documents to one of a set of predetermined classes based on identification of certain keywords in the documents. The keywords are identified from typed samples of documents which have been pre-assigned to respective ones of the classes. In the method, typed word images are used as training samples for training keyword models which identify keywords in the handwritten documents. Other aspects relate to a method for categorizing handwritten documents with such a categorizer into categories, based on frequencies of identified keywords, and to a computer program product which includes instructions for performing the exemplary methods. Aspects of the exemplary embodiment also relate to an apparatus for training a categorizer and to a categorization system employing the trained categorizer which may be used in a method for categorizing handwritten documents, based on spotting handwritten keywords in document images.

The exemplary categorizer training method relies on a collection of both handwritten and typed training documents which are each manually labeled with a label corresponding to a respective one of a finite set of categories. Handwritten documents are those which, in their original form, were prepared by hand, using a writing implement, such as a pen, pencil, or the like. Typed documents are those, which in their original form, were prepared using generated type fonts, such as with a computer keyboard, keypad, typewriter, or the like, or which have been automatically generated by a computer based on stored information. As will be appreciated, both handwritten and typed documents may be scanned or otherwise converted to digital form for processing. Typical handwritten and typed documents to be processed by the categorizer may include letters, filled forms, invoices, receipts, combinations and portions thereof, and the like.

The exemplary embodiment obviates the need for manually selecting keywords and manually collecting handwritten samples of keywords for use as training data for the categorizer by automatic or semi-automatic extraction of keywords from the typed documents and computer generation of training examples in different typographic fonts for each keyword that is to be searched for in a handwritten document image.

An assumption, which can be verified in practice, is that similar requests, whether typed or handwritten, have similar textual content, i.e., are likely to use a common set of words with approximately the same frequencies. The typed documents are not only used to find discriminative words useful as keywords for the handwritten document categorization system, but can also be used to tune keyword model parameters. In various embodiments, at least some of the keywords used by the categorizer in assigning handwritten documents to one of a set of categories are generated automatically from the labeled typed documents.

Figure 1:
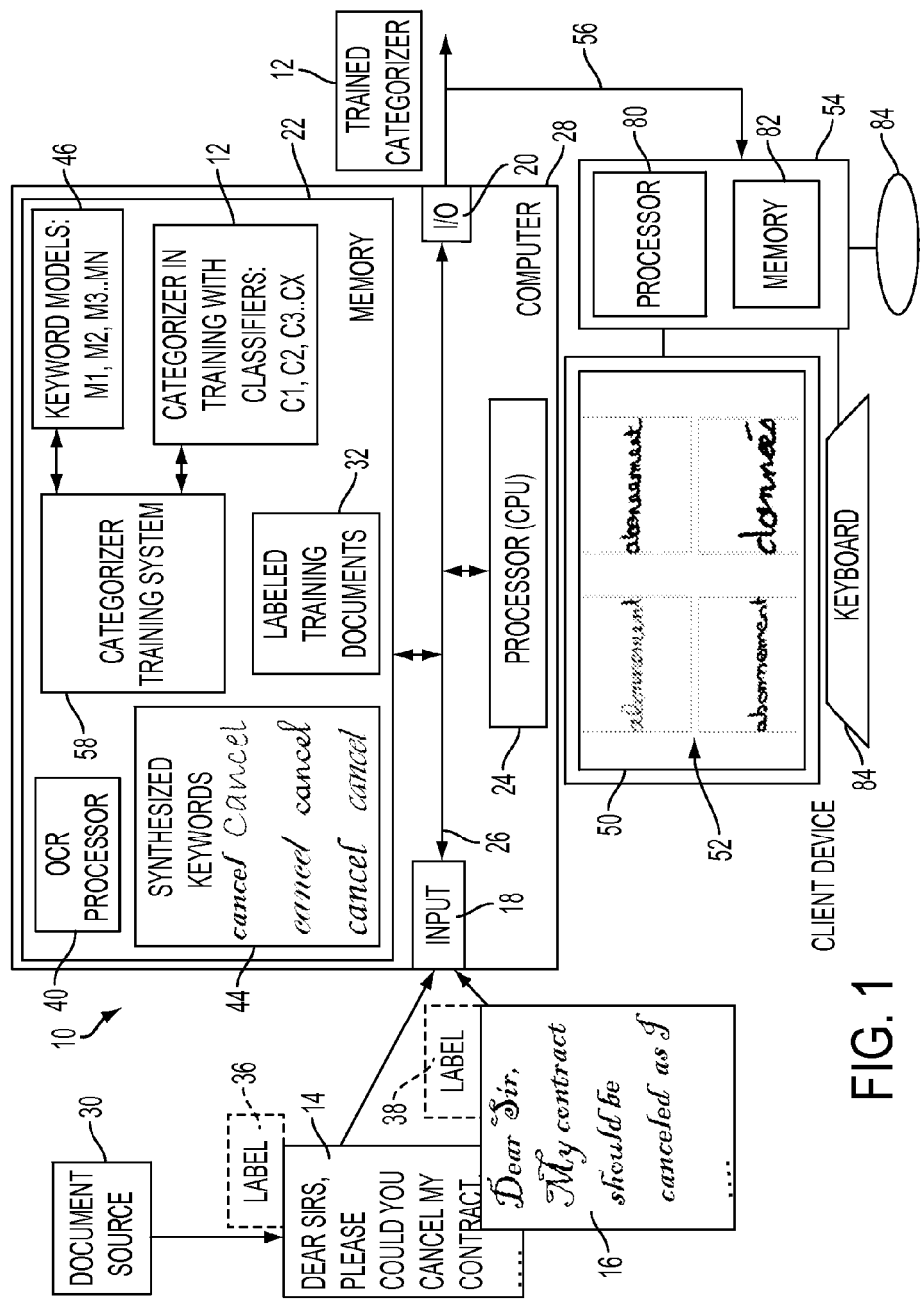
FIG. 1 is a schematic functional block diagram of a computer apparatus which hosts a system for training a categorizer to categorize handwritten documents based on handwritten words in document images, in accordance with one aspect of the exemplary embodiment.

FIG. 1 illustrates an apparatus/system 10 for training a handwritten document categorizer 12 using a training set of typed and handwritten documents 14, 16 from considered categories together with their category labels. The illustrated categorizer 12 includes a set of binary classifiers $C_1$, $C_2$, $C_3$ ... $C_x$, e.g., one for each document category, although multiclass classifiers are also contemplated. x can be, for example, at least 2 and in one embodiment at least 3 or at least 4. x can be up to 100 or more, depending on the number of categories. However, x is usefully up to about 20, e.g., from 5 to 10. Where there is a large number of potential categories, some can be assigned to an "other" category, such as those with relatively few training samples.

The illustrated apparatus 10 includes one or more inputs/outputs 18, 20, for communicating with external devices, memory 22, and a processor 24, all connected by a data/control bus 26. Apparatus 10 may be embodied in one or more computing devices 28, such as a general purpose computer or dedicated computing device, such as a desktop or laptop computer, PDA, web-based server, network server, or the like. The exemplary processor 24 controls the overall operation of the computer device 28 by execution of processing instructions which are stored in memory 22 connected to the processor. Memory 22 also stores the categorizer 12 during training and optionally also during use of the categorizer in a categorization process.

The memory 22 can include random access memory (RAM), read-only memory (ROM), a hard disk, optical disk, combinations thereof, and the like, and may be physically located in the computing device 28 or parts thereof may be accessible to the computing device, e.g., via a local area network or the Internet.

The digital processor 24 can be variously embodied, such as by a single-core processor, a dual-core processor (or more generally by a multiple-core processor), a digital processor and cooperating math coprocessor, a digital controller, or the like.

Documents 14, 16 to be processed by system 10 are received by input 18 from a suitable source 30 of such documents, such as a scanner, camera, data storage device, or the like and may be stored (as shown at 32) in a volatile portion of memory 22 during processing. The input documents 14, 16 include a set of typed documents 14, manually labeled by category, and a set of handwritten documents 16, also manually labeled by category. Each document 14, 16 may comprise one or more digital pages, each page comprising one or more images, such as binary images. Category labels 36, 38 are associated with the individual documents, or input separately, e.g., as list.

The apparatus 10 includes an optical character recognition (OCR) processor 40, e.g., stored in memory 22 and executed by processor 24, for processing the input typed documents and identifying words in each typed document. Alternatively, the typed documents may be OCR processed elsewhere, prior to input to the system. Memory 22 also stores a set of synthesized keyword samples 44. Apparatus 10 also stores a set 46 of keyword detectors or models $M_1$, $M_2$, $M_3$, $M_4$ ... $M_n$, one model for each of a set of keywords, whose parameters are at least initially trained on the synthesized samples 44 prior to training the individual classifiers $C_1$, $C_2$, etc of categorizer 12.

Apparatus 10 may be linked to a display 50, such as an LCD screen or computer monitor, which allows a reviewer to assess the accuracy of the keyword models 46 in retrieving keywords in handwritten samples, e.g., by reviewing a set of retrieved samples 52. The exemplary display 50 is associated with a client computing device 54, linked to the apparatus 10 by a wired or wireless link 56, such as cable, a local area network, or a wide area network, such as the Internet.

Figure 2:
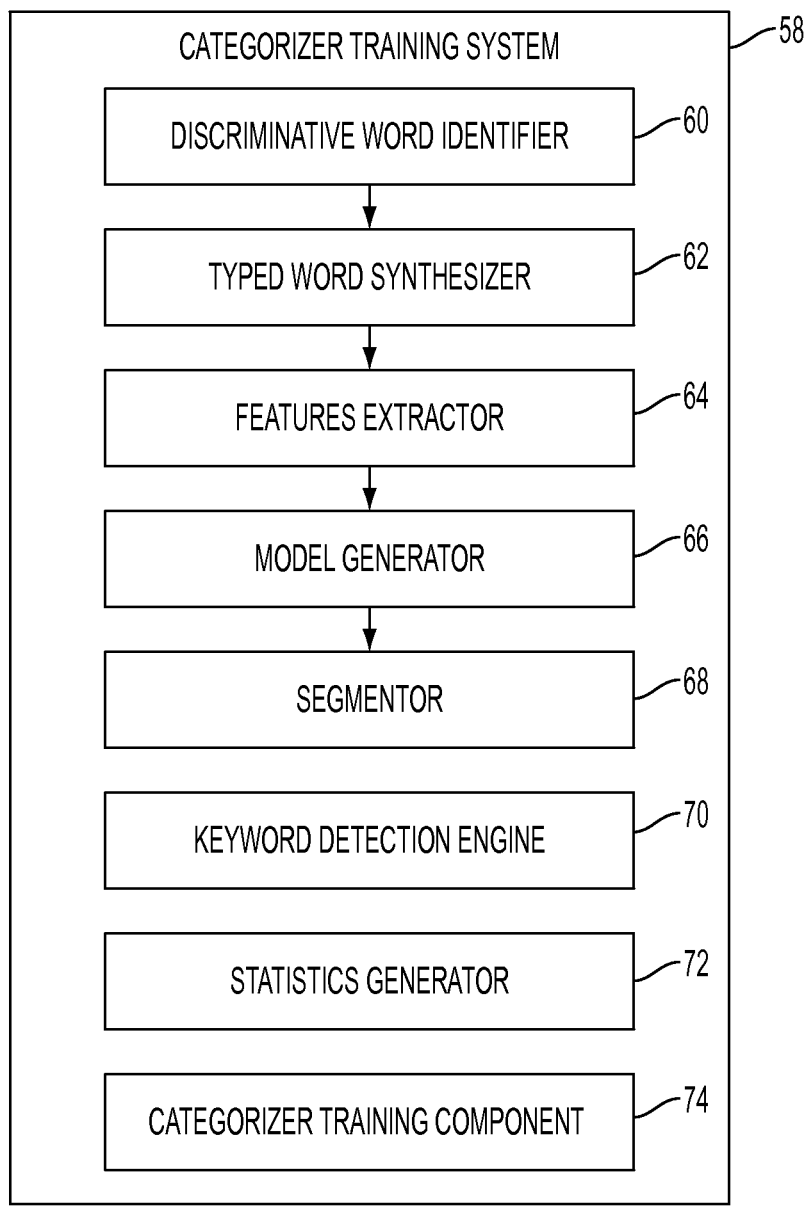
FIG. 2 illustrates components of the system for training a categorizer of FIG. 1.

Apparatus 10 includes a categorizer training system 58 for training the categorizer 12, which may be stored in memory 22. As illustrated in FIG. 2, the categorizer training system 58 includes a number of processing components which may be separate or combined, including a discriminative word identifier 60, a typed word synthesizer 62, a features extractor 64, a model generator 66, a segmentor 68, a keyword detection engine 70, a statistics generator 72, and a categorizer training component 74. Components 60, 62, 64, 66, 68, 70, 72, 74 may be in the form of hardware or software. In the illustrated embodiment, these components are in the form of software instructions stored in memory 22 which are executed by the processor 24. The components are best understood with reference to the categorizer training method described below and are only briefly described here.

The discriminative word identifier 60 identifies, for each category, a set of the most discriminative words, based on the words extracted from the OCR-processed labeled typed documents. Some or all of these discriminative words can be used as keywords for that category. The synthesizer 62 synthesizes typed samples 44 of each of the keywords using a set of different fonts which may be stored as bitmaps. Useful fonts are those which simulate cursive handwriting. The features extractor 64 extracts features from the synthesized training images 44. In the exemplary embodiment, the features are extracted from patches generated by a sliding window 76, which is translated stepwise across the training image 44, as illustrated schematically in FIG. 6, e.g., in the manner described in any one of U.S. Ser. Nos. 11/847,742, 11/847,757, 12/014,193, 12/169,101, and 12/212,964, although other low level feature extraction methods are also contemplated.

The model generator 66 generates a respective statistical model $M_1$, $M_2$, $M_3$, etc., for the respective keyword based on the extracted features of all the typed samples of that keyword. The segmentor 68 operates on the labeled handwritten documents 16 and segments these to generate a set of word images 52 for each document. The segmentor 68 operates without consideration of the individual characters which form the handwritten word image. A handwritten word image 52 can thus comprise any object which is capable of being identified as a discrete entity by the particular segmentation techniques being used. The same features extractor 64 can be used for extracting features from the handwritten word images as for the synthesized typed samples 44. The keyword detection engine 70 applies the trained models $M_1$, $M_2$, $M_3$, etc., to the features extracted from the segmented handwritten word images 52 to identify word images which match one of the keywords. The statistics generator 72 generates document statistics for each document, e.g., a representation in the form of histogram for each labeled handwritten document 16, based on the occurrences of the identified keywords. The training component 72 trains classifiers $C_1$, $C_2$, etc., based on the histograms of all the labeled handwritten documents 16 for the respective category. The trained categorizer 12 and keyword models $M_1$, $M_2$, $M_3$, etc., may be output to another computing device. Alternatively, the same computing device 28 can be used for both training the categorizer 12 and applying it to assign labels to unlabeled handwritten documents.

While the system 10 is shown as having eight processing components 60, 62, 64, 66, 68, 70, 72, 74 it is to be appreciated that two or more components may be combined or a component divided into two or more components. Components 60, 62, 64, 66, 68, 70, 72, 74 may all be resident in computing device 10 or may be otherwise accessible thereto.

Client device 54 may communicate with the system 58 via input/output (I/O) device 20 and may include a processor 80, memory 82, and a user input device 84, such as a keyboard, keypad, touch screen, cursor control device, joystick or combination thereof.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
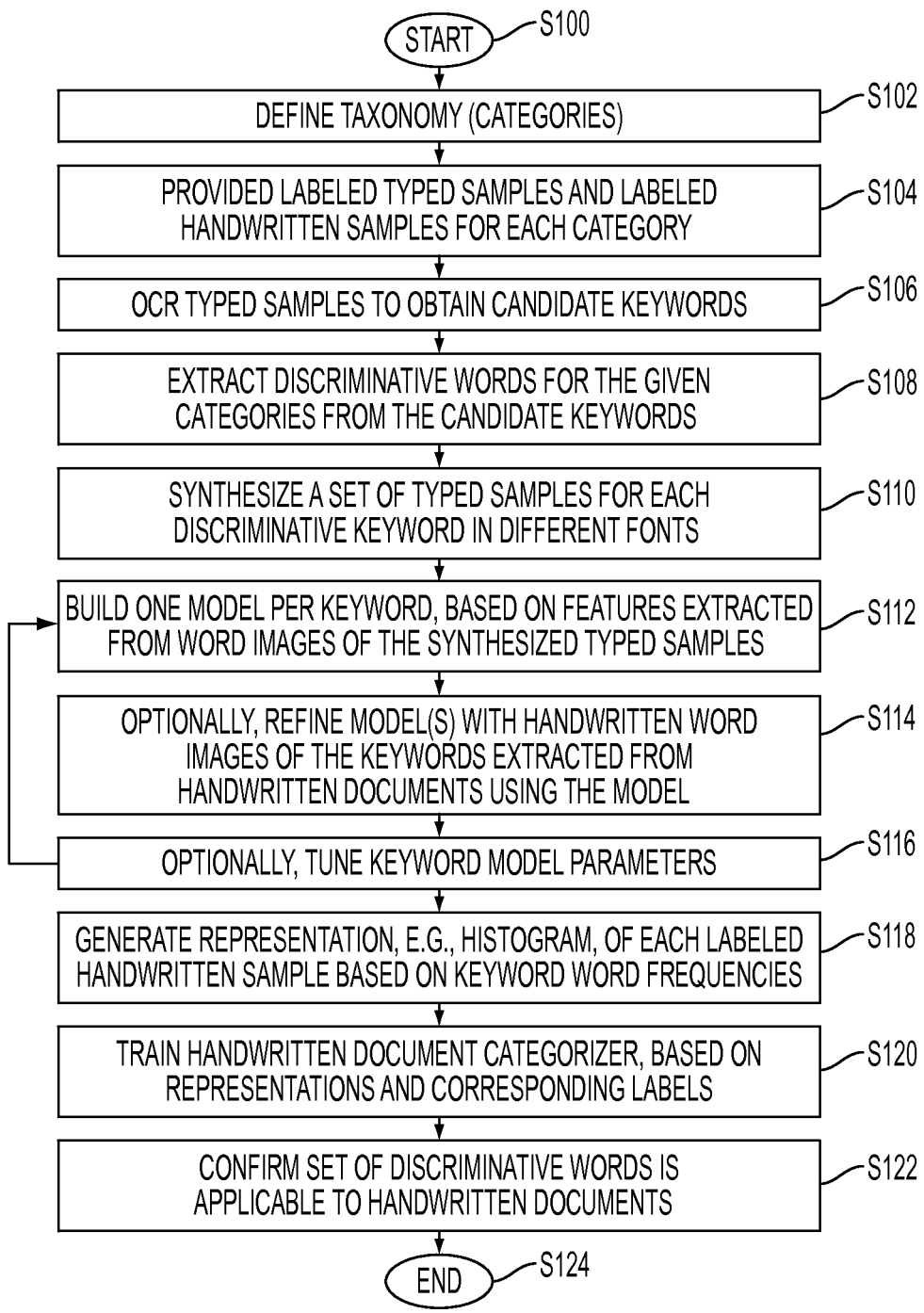
FIG. 3 is a flow diagram which illustrates an exemplary method for training a categorizer to categorize handwritten documents based on handwritten word occurrences in document images.

FIG. 3 illustrates steps of an exemplary automated method for training a handwritten document categorizer 12 using a training set of handwritten and typed documents from considered categories together with their category labels. The process of training a handwritten document categorizer can be computer assisted or fully automated. The trained categorizer can then be used for assigning handwritten documents to appropriate categories, based on keyword identification. In the exemplary method any one or more of the steps may be computer implemented, by computer processor execution of instructions stored in memory. For example, the method may be implemented with a system 10 as illustrated in FIG. 1. The method begins at S100.

At S102, a set of document categories is identified/provided.

At S104, sets of labeled typed document samples and labeled handwritten document samples are provided for each defined category.

At S106, the typed documents 16 are OCR processed to identify the words therein (which can be considered as candidate keywords).

At S108, a set of keywords is extracted for each category, based on the candidate keywords. Specifically, discriminative words are identified from the candidate keywords, and keywords for the given categories are extracted from the discriminative words.

At S110, computer generated typed samples 44 for each keyword are synthesized in a set of different fonts.

At S112, one model M per keyword is built, based on features extracted from word images of the typed samples 44.

At S114, each model M may be refined or retrained with handwritten word images of the keywords extracted from handwritten documents using the model.

At S116, keyword model parameters may be tuned, e.g., by matching detection statistics measured on handwritten documents with the same statistics measured on typed documents so that the keywords are identified in handwritten documents with approximately the same frequencies as in the typed documents in the same category.

Steps S114 and S116 may be iterated one or more times to refine the models.

At S118, the labeled handwritten documents are processed with the trained models to extract keywords and keyword statistics are computed therefrom. For example, one bag-of-keywords in the form of a histogram representation is computed per labeled handwritten document 16.

At S120, a categorizer is trained, for example, by training a classifier (one per category) on keyword statistics for each handwritten training document 16. In particular, the set of histogram representations, one per document, generated at S118 is fed in to the appropriate binary classifier $C_1$, $C_2$, $C_3$, etc. to train the classifier. Histograms for handwritten documents from other categories may be input to the classifier as negative examples. Each classifier is thus trained to assign a probability of a handwritten document being in the respective category, based on its histogram or other keyword occurrence statistics.

At S122, the thus-trained categorizer 12 may be evaluated and parameters adjusted.

The method ends at S124.

Figure 4:
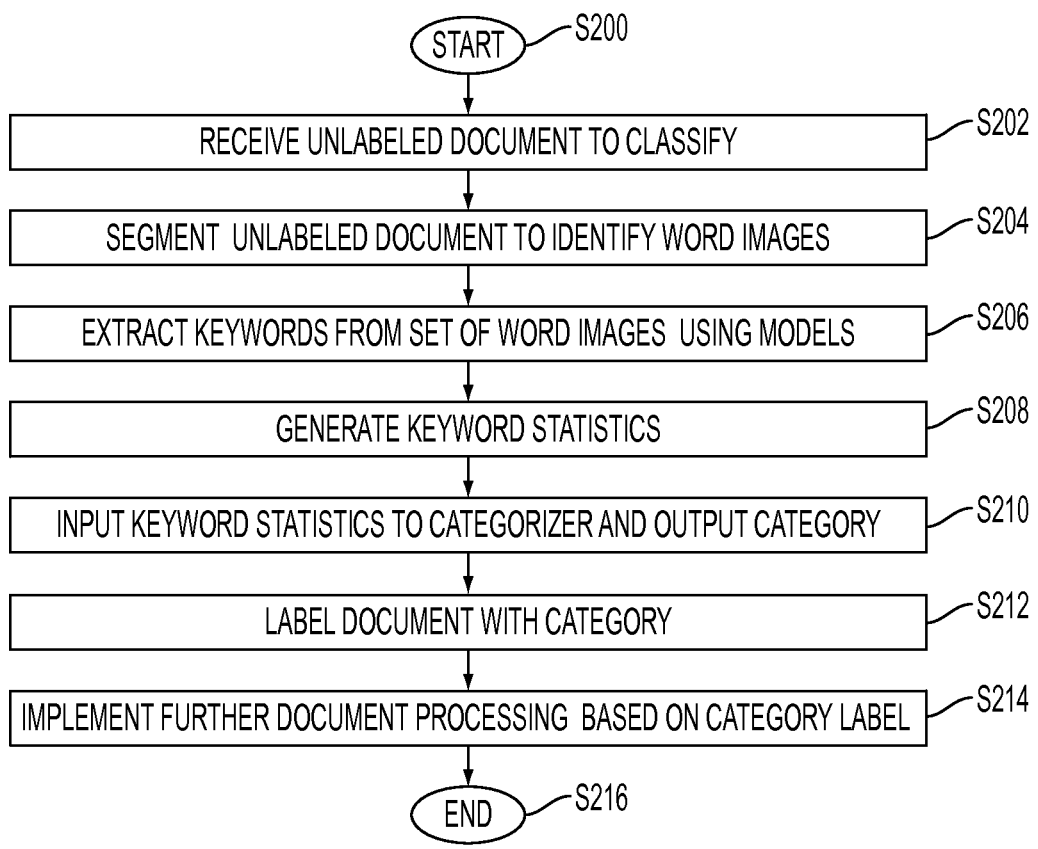
FIG. 4 is a flow diagram which illustrates an exemplary method for using the categorizer trained by the method of FIG. 3 to categorize handwritten documents.
Figure 5:
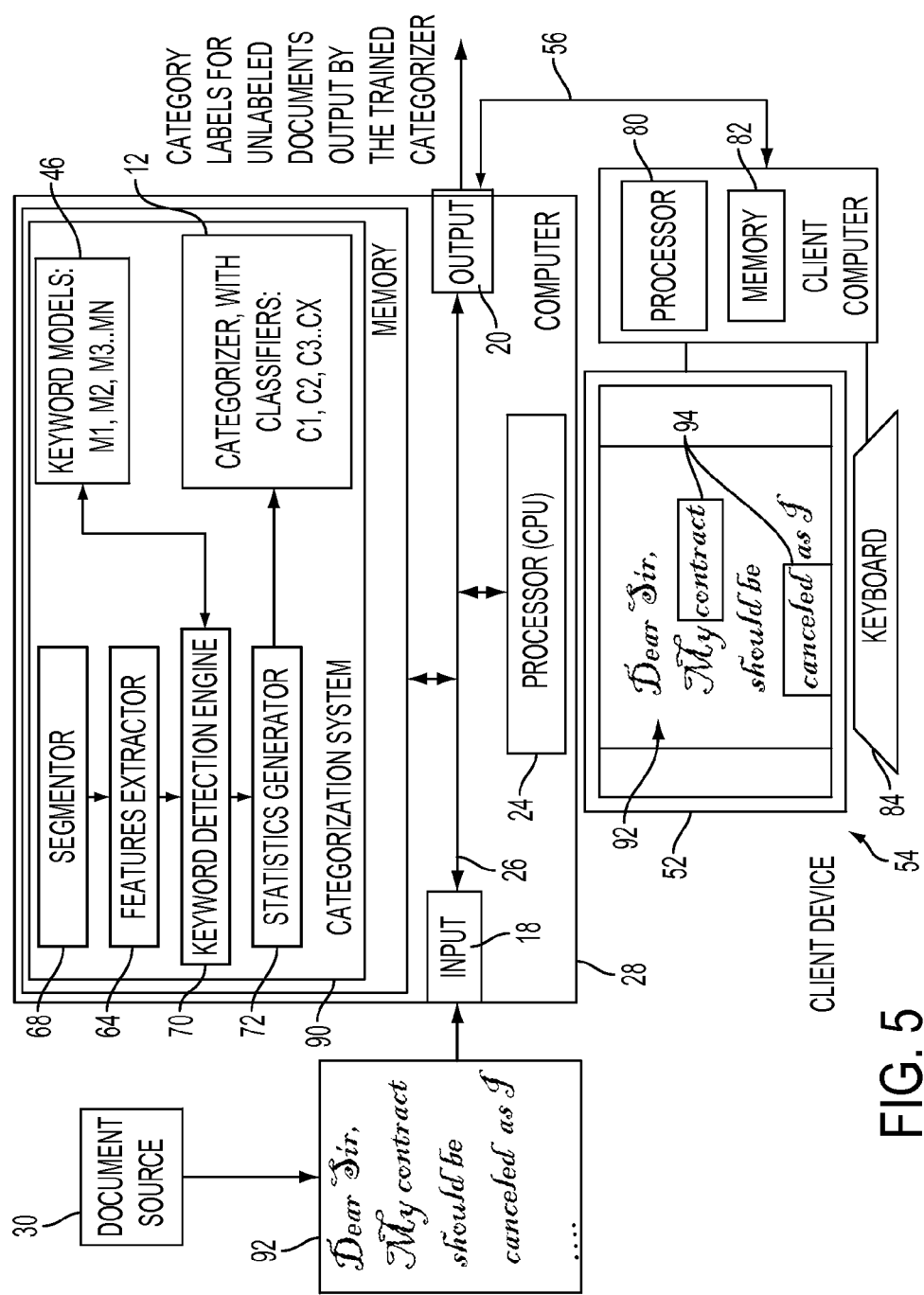
FIG. 5 is a schematic functional block diagram of an apparatus which hosts a the trained categorizer for categorizing handwritten documents based on handwritten words in document images in accordance with another aspect of the exemplary embodiment.

At runtime, the same pipeline is followed: the keyword detectors (models $M_1$, $M_2$, $M_3$, ... $M_n$) are run on the unlabeled test document to be categorized, a bag-of-keywords representation is computed, and classification is performed on this histogram. By way of example, FIG. 4 illustrates an exemplary categorization method which may be performed with the trained categorizer 12 and set 46 of keyword models. A categorization system 90 for performing the method is illustrated in FIG. 5. Since the system 90 can be hosted by the same computer 28 as shown in FIG. 1, and utilize many of the same components, similar element numbers will be used for similar components.

The method begins at S200 and assumes the availability of a trained categorizer 12 and keyword models $M_1$, $M_2$, $M_3$, $M_4$, etc.

At S202, an unlabeled document 92 to be categorized is received by the system 90 from a source 30 such as a scanner, and stored in memory 22.

At S204, word images are extracted from the document with the segmentor 68.

At S206, keywords are identified in the document by the keyword detection engine 70, which applies the entire set 46 of trained models to the each extracted word image, or to at least a certain number or representative set of word images, e.g., if the document is large.

At S208, keyword statistics are generated by histogram generator 72, based on the keywords identified, such as a histogram representation of the form generated at S120 above.

At S210, the histogram is input to the categorizer 12, which applies the trained classifiers $C_1$, $C_2$, $C_3$, etc., and outputs category information for the document 92, e.g., assigns the document to one of the set of categories, or to an "other" category.

At S212, the input document 92 is labeled with the assigned category.

At S214, further processing of the document 92 may be implemented, based on its category. For example, processing may include one or more of: sending documents assigned to the same category for review by a particular department, displaying documents in a given category, ordering the processing of the documents based on category, with important category documents being scheduled first, directing documents assigned to the "other" category for manual review, and the like. The method ends at S216.

The methods illustrated in FIGS. 3 and 4 may be implemented in a computer program product or products that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3 or 4, can be used to implement the exemplary categorizer training and operating methods.

Various details of the system and method now follow.

In the following, further details of the methods and apparatus follow as well as possible alternatives to a fully automated system, e.g., to incorporate the human operator in the training process to improve the quality of the categorizer.

Training Material

It is assumed that a set of categories $C_1$, $C_2$, $C_3$, etc. have been defined (S102). The type of categories used can be very specific to the business needs of the user of the system. For example, the system may be tailored to a particular customer, for which a customer taxonomy, i.e., a list of relevant document categories which correspond to different customer business processes, is identified by the customer. If the customer has identified a large number of document categories, the most important of these categories may be identified, and the remaining categories grouped together, e.g., into a single "other" category. The importance of the category may be based on the number of documents which are typically received in the category, or may be based on other customer requirements, such as the need to identify and process certain categories of document quickly. A set of labeled documents, both handwritten and typed are collected for each category. In the case of a digital mailroom, these may include letters, bills, invoices, and the like. In some embodiments, all the documents received in the same envelope are scanned as a single document. In one embodiment, some of the training documents may not belong to any of the pre-defined categories, in which case they are associated to a category "other". The category labeling is done at the document level, i.e., there is no need to annotate the documents on a per-word basis. For example, a trained employee may scan the documents by eye and based on experience, assign a label corresponding to the category that he or she would normally assign to that document in a manual categorizing approach.

Selection of Discriminative Keywords

A keyword, as used herein, can be a single word, short phrase or any other string of characters in a selected order. The keywords to be identified are generally known words in a given natural language, although they need not be. The types of keywords which can be searched are limited only by the set of the characters which can be used for synthesizing keywords in different fonts. For example, keywords may be generated from a character set comprising the 26 letters of the alphabet, in both upper and lower case, the numbers 0-9, and other symbols, such as punctuation as well as symbols, such as $, €, and &. All of the characters in the character set can be automatically generated in a plurality of different fonts.

Discriminative keywords are identified from the manually labeled, typed documents 14, e.g. typed letters. The object is to identify the words which are specific (i.e., discriminative) for each category. To that end, the typed documents are first OCRed to identify text as a sequence of words and other characters ("tokens") (S106). The language may be checked. Preprocessing of the identified words may be performed, such as stemming (identifying a normalized form of a word, such as the word "cancel" in the case of variants, such as "canceled," "cancels," "cancelling," and so forth), and removal of "stop words" (common words which appear with high frequency in documents in general, such as "the" and "and"). The remaining words may be checked against a dictionary to make sure that they exist.

Then, for each of the labeled typed documents, a statistical representation is generated. In one embodiment, a bag of words representation is generated. This can be a histogram which shows the number of occurrences of each of the words identified in the document (optionally normalized in some way such that the most frequent word is given a maximum score, e.g., of 1, or so all values sum to 1). The bag of words representation can be in the form of a vector in which each word found in the labeled documents for a given category is accorded a dimension and has a value of 0 when the word does not appear in that document.

The next step is to identify, for each category, the most discriminative words among the words identified for all the typed documents. These are words (single words or multi-word expressions) that statistically occur at a different frequency (more or less frequently) in documents labeled with a given category than in a general pool of documents (such as a collection of typed documents from which the labeled documents were obtained).

Various ways are contemplated for finding discriminative words from these histograms. In one method the discriminativeness of a given word for a given category is computed based on the relative occurrence of the word in the considered category compared to its average occurrence in any category. More precisely, let $p(w|c)$ be the probability of observing word $w$ in category $c$ and let $p(w)$ be the probability of observing word $w$ in any category. The discriminativeness can be defined as:

$$(p(w|c) - p(w)) \log\left(\frac{p(w|c)}{p(w)}\right), \quad \text{Eqn. 1}$$

which is a non-negative quantity. Note that according to this definition, a word is discriminative for a given category if (i) it occurs very frequently or (ii) very infrequently compared to other categories. In one embodiment, the focus is on words which are considered discriminative for the first reason (i.e. if $p(w|c)>p(w)$) but infrequent words could also be taken into account.

The measure of discriminativeness, e.g., the value of Eqn. 1, can be used to rank the word in a given category. In one embodiment, the K most highly ranked words are selected. In other embodiments, the words which exceed a given threshold of discriminativeness are selected. In the latter case, a constraint may be applied such that a predetermined minimum number and/or maximum number of words is selected. For example, the constraint may be that K is at least 2 (which in some cases may require the threshold to be lowered) and can be no more than 20. For example, in a category for cancellation of contracts, the most discriminative words may include expected words, such as "contract," "cancellation," and "cancel" but also less expected words such as "subscription" and "number". These additional words can provide additional cues to the system and therefore may help increase the categorization accuracy.

One suitable tool for determining discriminativeness is the CategoriX™ text categorizer from Xerox. Such a tool 60 can be used for the discriminative keyword selection. The CategoriX system offers a way to compute the discriminativeness of a given word for a given category. For details of the CategoriX system, see U.S. patent application Ser. No. 12/417,110, filed Apr. 2, 2009, entitled PRINTER IMAGE LOG SYSTEM FOR DOCUMENT GATHERING AND RETENTION, by Caroline Privault, et al.; U.S. patent application Ser. No. 12/479,972, filed on Jun. 8, 2009, entitled SYSTEM AND METHOD FOR ASSISTED DOCUMENT REVIEW, by Caroline Privault, et al., U.S. Pub. No. 2003/0101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al.; U.S. Pat. No. 7,139,754, issued Nov. 21, 2006, entitled METHOD FOR MULTI-CLASS, MULTI-LABEL CATEGORIZATION USING PROBABILISTIC HIERARCHICAL MODELLING, by Cyril Goutte, et al.; U.S. Pat. No. 7,457,808, issued Nov. 25, 2008, entitled METHOD AND APPARATUS FOR EXPLAINING CATEGORIZATION DECISIONS, by Cyril Goutte, et al.; U.S. Pub. No. 2007/0005340, published Jan. 4, 2007, entitled INCREMENTAL TRAINING FOR PROBABILISTIC CATEGORIZER, by Cyril Goutte, et al.; U.S. Pub. No. 2007/0005639, published Jan. 4, 2007, entitled CATEGORIZATION INCLUDING DEPENDENCIES BETWEEN DIFFERENT CATEGORY SYSTEMS, by Eric Gaussier, et al.; U.S. Pub. No. 2007/0143101, published Jun. 21, 2007, entitled CLASS DESCRIPTION GENERATION FOR CLUSTERING AND CATEGORIZATION, by Cyril Goutte; U.S. Pub. No. 2007/0239745, published Oct. 11, 2007, entitled HIERARCHICAL CLUSTERING WITH REAL-TIME UPDATING, by Agnes Guerraz, et al.; U.S. Pub. No. 2008/0249999, published Oct. 9, 2008, entitled INTERACTIVE CLEANING FOR AUTOMATIC DOCUMENT CLUSTERING AND CATEGORIZATION; by Jean-Michel Renders, et al.; and U.S. application Ser. No. 12/174,721, filed Jul. 17, 2008, entitled CALIBRATING AN AUTOMATIC DOCUMENT CATEGORIZER, by Jean-Michel Renders, et al., the disclosures of which are incorporated herein in their entireties by reference.

The method described above is essentially a generative approach. An alternative method for identifying discriminative words is to learn a linear discriminative classifier (e.g., using Sparse Logistic Regression, Logistic Regression, Support vector machines, or the like) on the bag-of-words representations and to keep only those words which contribute most to the classification.

In some embodiments, the list of discriminative keywords output by the discriminative word identifier 60 for a given category can be manually reviewed by a human operator who may discard some words, e.g. to keep the list of keywords (and therefore the computational cost) below a threshold.

There may be instances where a discriminative word for one category is also identified as a discriminative word for another category. However, in that case, the two categories should differ in one or more other discriminative words. In general, however, it is desirable that there is no overlap between keywords, otherwise where only one keyword is found in a document, the document categorizer 12 may have difficulty in making an assignment to one category. This can be resolved by dropping the overlapping discriminative word from the category for which it is least discriminative. The final selection of discriminative words for a given category become that category's keywords.

Training Keyword Models

Using the set of keywords obtained at S108, automatically synthesized keyword samples (word images) are produced in various fonts and used to train a model, such as a semi-continuous hidden Markov model, for each keyword, based on features extracted from the word images. Details of such an approach are to be found in above-mentioned application Ser. No. 12/212,964, filed Sep. 18, 2008, entitled HANDWRITTEN WORD SPOTTER USING SYNTHESIZED TYPED QUERIES, by José A. Rodriguez Serrano, et al.

An evaluation of a large range of fonts demonstrates that some fonts, which more closely resemble cursive writing, are better than others. Accordingly a set of fonts can be selected based on the performance of the model in retrieving matching word images from handwritten text.

Multiple samples for each keyword are thus generated by varying only the font. Specifically, a set of computer-generated images (training examples) of the keyword is automatically rendered using different computer typographic fonts. For example, as shown in FIG. 1, the word cancel has been rendered in six different fonts, to provide a set of rendered type font word images 44 although fewer or more fonts may be employed. While in the exemplary embodiment, a plurality of font types are used, in another embodiment, a single font is used to generate a single computer-generated image. In one embodiment, additional samples may be generated which do not replicate the keyword exactly. Such "noisy" samples may include common misspellings or spelling variations of the keyword formed by adding one or more letters, deleting one or more letters, or replacing one or more letters. For example, in addition to rendering the word cancel in a plurality of different fonts, the word cancell could also be rendered in a plurality of fonts.

Various types of models can be trained for generating a representation of the extracted features of the training images, such as hidden Markov models (HMMs), support vector machines, neural networks, or the like. In one embodiment, a semi-continuous hidden Markov model (SC-HMM) is used. Its particularity is that some parameters of the model (such as means and covariance matrices) are constrained to a universal background model (UBM) that is a way of modeling the vocabulary of the handwritten data. Thus even when trained with typed text images, the optimal parameters of the model have to "match" the handwritten vocabulary. This allows a better capability of linking typed and handwritten text. The SC-HMM may be trained on local gradient histogram features, as described in application Ser. No. 12/169,101. In this method, for each normalized image, a sequence of gradient-based feature vectors is computed from the patches extracted as the window 76 moves from left to right over the image 44.

When applied to a candidate word image 52 segmented from a handwritten sample which has been processed in the same way as the typed word images, the trained model may output a probability that the word image matches the given keyword. Alternatively, the probability values may be thresholded to provide a binary decision: the word image either matches or does not match the keyword. The particular threshold selected may be adjusted, as described in further detail below.

While the sliding window approach has proved effective, it will be appreciated that features may be extracted from patches of the word image based on a grid at one or more scales, or the like.

The resulting models may be used "as is" in some applications where high levels of accuracy are not required. It has been observed, however, that the performance of a model trained with synthetic word image samples can vary from one keyword to another. For example, models trained on longer words are often more accurate at identifying keywords than models trained on shorter words. To improve the accuracy of the models, at S114, models trained on the synthesized samples may be used to retrieve candidate keyword images from the set of handwritten training documents. At this stage, the model can be run just on word images extracted from documents labeled with the category for which the keyword is to be used, or can be run on documents from all categories. The top handwritten images (based on the probability of being a match for the model's keyword, as output by the model) are used to re-train the keyword model. The new keyword model thus produced has been observed to be significantly better than the model trained purely on synthetic samples. The resulting model may thus be based wholly or partially on actual handwritten word samples. The process can be repeated, with the retrained model used to re-query the word images extracted from the training set of handwritten documents to retrieve more handwritten word images for retraining the model. This improved model may be used to re-query the training set to obtain an even cleaner set of training images. The process of re-training and re-querying (which is similar to a pseudo-relevance feedback scheme) may be iterated any number of times, e.g., until the model accuracy reaches a threshold acceptable accuracy or a plateau is reached beyond which no significant improvement can be achieved.

In one embodiment, a human operator can interact with the system to select only correct handwritten word image samples to re-train the model (traditional relevance feedback). This can be a very fast interaction as the operator can quickly review dozens of word samples and identify the non-matching ones and any questionable ones with a few clicks.

One way to measure whether a keyword model is "good enough" is to run it on the training handwritten documents and obtain the distribution of matches (i.e., of detected images) over the various categories. This is compared with the corresponding distribution for the categories obtained for the typed set of documents to see if the two distributions are in reasonable alignment. One suitable measure for assessing alignment is the Kullback-Leibler divergence between the distributions, although any other divergence measure can be used.

If the alignment is not as good as desired, further tuning of the model parameters may be performed (S116). For each keyword model, a threshold probability may be defined. When a word image input to the model is accorded a probability which equals or exceeds the threshold, it is recorded as a match. The threshold probability can be tuned such that the likelihood of finding the word in a handwritten document matches that for a typed document in the same category. For this purpose, statistics may be extracted from the typed documents to set the detection threshold of each keyword model. For example, if the statistics show that the keyword "cancelation" appears in 50% of the typed contract termination letters then the threshold for the keyword model for the word cancellation can be adjusted so that the keyword model detects the word cancellation in approximately 50% of the contract termination training handwritten documents.

It is to be understood that the statistics measured on typed documents require only document-level labeling, not word level labeling.

Training the Handwritten Document Categorizer

Once the keywords have been identified and the models built, the models are run on the handwritten documents in each category. For each handwritten document, statistics representing the occurrence of the keywords in that document are computed (S118).

In one embodiment, the computation of the statistics representing the occurrence of the keywords in that document includes assigning a score to a given document with respect to a given category based on the occurrence of keywords. For example, the score may be a sum of the total number of occurrences of all the keywords of the considered category in the document. While such a score may be sufficient for particularly discriminative keywords (e.g., "cancelation"), it may be insufficient where there are more ambiguous keywords (e.g., "contract").

In another embodiment, each handwritten document is described as a bag-of-keywords representation. The document is described as the number of occurrences of each keyword. At the training stage, all the keywords can be considered, not just those identified for the category. Thus, each document can be a vector whose dimensions equal the total number of keywords over all categories. For example, consider the simplified case where there are only three categories with the following keywords Category 1 (contract cancellation): contract, cancel, cancellation Category 2 (overdue accounts): bill, overdue, payment Category 3 (equipment installation): install, installation Suppose that a handwritten document 16 has three occurrences of contract and one occurrence of payment (i.e., the respective models have identified these words with at least the respective probability thresholds). Then an eight dimensional vector can be generated: (3,0,0,0,0,1,0,0) for the document.

In another embodiment, rather than using binary values (1 for an occurrence 0 for not), since the output of the model M for a given word image is probabilistic (e.g., between 0 and 1), these soft occurrence values are considered. The probabilities for each dimension may be summed. Thus, in the illustrated example, a vector such as (2.5, 0.2, 0.1, 0.3, 0.4, 0.9, 0.2, 0.3) may be obtained. The vector may be normalized, for example, so that all the values sum to 1 or other fixed value. Or, the values may be scaled so that the highest value=1. In another embodiment, the values in the vector may be weighted to reflect the discriminativeness of the keywords for a given category. For example, the weights may be in accordance with the discriminativeness values obtained previously at S108 (higher weightings being accorded to higher discriminativeness values), and the vector optionally then normalized. Alternatively, weights can be generated by remeasuring discriminativeness from the keyword statistics for the handwritten documents. For example discriminativeness can be computed based on the frequency of discriminative words in handwritten training samples vs. frequency of discriminative words in a sample set which includes handwritten samples from other categories.

In this way, one bag-of-keywords representation is computed for each training handwritten document. A classifier C is then trained per category on these vectorial representations. The classifier may be a linear classifier, which is trained by sparse linear regression, or the like. However, any type of classifier may be used.

Using a discriminative classifier can help to overcome some of the limitations of the previous steps. For example, if a keyword is not discriminative enough or if the keyword model is unreliable, then the considered keyword will tend to be detected in irrelevant documents. Therefore, the discriminative classifier should learn to give less weight to the occurrences of this keyword.

Extraction of Word Images (S114, S204)

The exemplary categorization system 12 and methods rely on word identification, which is based on features of the entire word, without the need for segmentation into individual characters or OCR, and without the need to recognize non-keywords. A typical word spotting algorithm starts by segmenting the document in image space into image blocks corresponding to individual words. The document is typically generated by an optical scanner or digital camera, although the document may be generated or acquired in other ways. The segmenting is suitably done by identifying whitespace that typically surrounds each word and using the whitespace to delineate boundaries of extracted word images. Word segmentation can also include global document pre-processing such as orientation correction, de-noising, illumination normalization, document region segmentation, etc.

The exemplary embodiment is discussed in the context of binary images. In this context, the term "image" refers to a representation of a two-dimensional data structure composed of pixels. A binary image is an image where a given pixel is either "ON" (active) or "OFF" (inactive). Pixels are generally defined to be active if they are black and inactive if they are white. It should be noted that the designation of black as ON and white as OFF reflects the fact that most documents of interest have a black foreground and a white background. It is to be appreciated that the exemplary method is not limited to black and white images but is appropriate to images of any suitable color separation or separations. Negative images may be converted to positive images, if desired, prior to processing.

Figure 6:
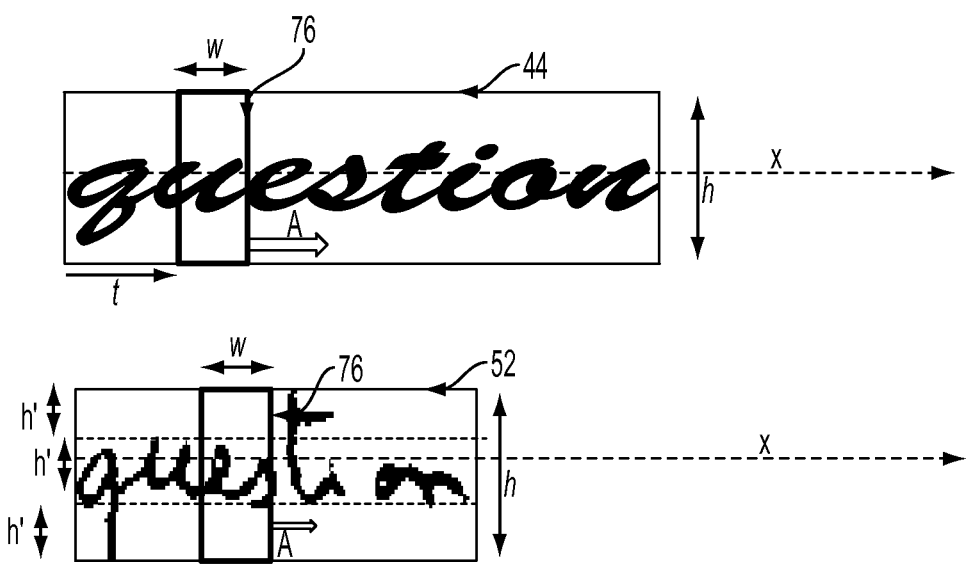
FIG. 6 illustrates extraction of features from text and handwritten word images.

In the exemplary embodiment, illustrated in FIG. 6, each word image is scaled to a fixed pixel height h and a sliding window 76 several pixels in width w and the same height h as the word image is translated stepwise across the word from left to right in the direction of arrow A (or right to left). At each window position, features are extracted from the image data within the window, such as gradient features, color features, or the like. The low level features may be concatenated to form a vector, optionally reduced in dimension using principal component analysis, or the like.

Position information may also be used in training the model, i.e., the window's location t in relation to the beginning or end of the word.

Features derived from each extracted word image are processed by each model to determine whether any extracted image corresponds to a keyword of interest. In one embodiment, a sliding window is translated stepwise across a word image presumed to be a word and features are extracted from image data in the windows, as described, for example, in above-mentioned U.S. Pub. Nos. 2009/0060335 and 2009/0180695, and U.S. application Ser. Nos. 12/169,101 and 12/212,964.

Categorization of Test Documents

As described above with reference to FIG. 4, a histogram of keyword frequencies is generated. The histogram may be input to each classifier $C_1$-$C_x$. Then, each classifier may output a probability of the document being in that class. The categorizer then assigns the document to the category whose classifier outputs the highest probability.

In one embodiment, the trained categorization system 90 simply returns the recognized category and a category label may be associated with the document 92. In other embodiments, the system can also display the page with the detected keywords 94 highlighted, as illustrated in FIG. 4. The color of the highlight may depend on the confidence of the keyword detection engine 70. In the case where the categorization output is checked by a human operator, displaying detected keywords 94 can significantly speed-up the review process as it can avoid the reviewer having to read the complete letter.

The exemplary system and method find application in a digital mailroom, where the goal is to capture the customer's intent based on the content of an envelope, which may be made up of a number of documents (e.g., a letter, a copy of an invoice, a utility bill, etc. . . . ). The method avoids the need for a human reviewer to review the full correspondence. However, it is also contemplated that human review may be used to confirm its overall category, e.g., by reading the accompanying letter and reviewing the identified keywords, and confirm to which business process the envelope's content should be forwarded.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for training a handwritten document categorizer comprising:
    defining a taxonomy comprising a set of categories;
    for each of the categories in the set of categories, extracting a set of discriminative words, from a training set of typed documents labeled by category, the extracting of the set of discriminative words including computing frequencies of words in the labeled typed documents and, based on the word frequencies, identifying words whose frequency of occurrence in typed documents labeled with the category differs from a frequency of occurrence in typed documents labeled with other categories or for all the categories;
    for each keyword in a group of keywords, synthesizing a set of computer-generated samples of the keyword with a plurality of different type fonts, the keywords comprising at least one discriminative word for each category in the set of categories;
    generating a keyword model for each keyword in the group, parameters of the model being estimated based on features extracted from the synthesized samples of that keyword, wherein each synthesized typed sample comprises a computer-generated binary image of a fixed pixel height and wherein the extracted handwritten word images are normalized to the same fixed pixel height and are binary images;
    computing keyword statistics for each of a set of scanned handwritten documents labeled by category from the set of categories by applying the generated keyword models for the group of keywords to word images extracted from the scanned handwritten documents, each keyword model outputting a probability of word images in the respective handwritten document matching the respective keyword, frequencies for each keyword being computed as a function of the probabilities, the statistics being based on the computed frequencies;
        with a computer processor, training a handwritten document categorizer with the keyword statistics computed for the set of handwritten documents and the respective handwritten document category labels.

2. The method of claim 1, wherein the generating of the keyword model includes tuning keyword model parameters by matching detection statistics for the keyword measured on labeled handwritten documents with statistics measured on typed documents labeled with the same category.

3. The method of claim 1, wherein the keyword model comprises a semi-continuous hidden Markov model.

4. The method of claim 1, wherein the keyword statistics are based on a histogram of frequencies of all the keywords in the group of keywords that are identified in the respective handwritten document.

5. The method of claim 1, wherein the categorizer includes a set of binary classifiers, one for each of the categories and the method includes training each of the classifiers with keyword statistics for handwritten documents labeled with the respective category.

6. The method of claim 1, wherein the generating of the model for each keyword based on features extracted from the typed samples comprises extracting features from patches of a computer-generated image of the typed sample.

7. The method of claim 1, wherein the applying of the generated keyword models to word images extracted from the scanned handwritten documents comprises, for word images extracted from the scanned handwritten documents, extracting features from patches of each word image.

8. The method of claim 7, wherein the extracting of features from patches of the word image comprises generating the patches by translating the word image stepwise with a sliding window of fixed height and width and at each step, extracting a patch.

9. The method of claim 8, further comprising, with each keyword model, based on the extracted features, determining at least one of:
    whether the extracted word image matches the model's keyword; and
    a computed probability of the extracted word image matching the model's keyword.

10. A handwritten document categorizer generated by the method of claim 1.

11. A computer program product encoding instructions, which when executed by a computer, causes the computer to perform the method of claim 1.

12. A method for training a handwritten document categorizer comprising:
    defining a taxonomy comprising a set of categories;
    for each of the categories in the set of categories, extracting a set of discriminative words, from a training set of typed documents labeled by category, the extracting of the set of discriminative words including computing frequencies of words in the labeled typed documents and, based on the word frequencies, identifying words whose frequency of occurrence in typed documents labeled with the category differs from a frequency of occurrence in typed documents labeled with other categories or for all the categories;
    for each keyword in a group of keywords, synthesizing a set of computer-generated samples of the keyword with a plurality of different type fonts, the keywords comprising at least one discriminative word for each category in the set of categories;
    generating a keyword model for each keyword in the group, parameters of the model being estimated based on features extracted from the synthesized samples of that keyword;
    computing keyword statistics for each of a set of scanned handwritten documents labeled by category by applying the generated keyword models for the group of keywords to word images extracted from the scanned handwritten documents, each keyword model outputting a probability of word images in the respective handwritten document matching the respective keyword, frequencies for each keyword being computed as a function of the probabilities, the statistics being based on the computed frequencies;
    with a computer processor, training a handwritten document categorizer with the keyword statistics computed for the set of handwritten documents and the respective handwritten document labels;

with each generated model, identifying word images in the handwritten documents which match the model's keyword with at least a threshold probability; and retraining the model with the identified word images.

13. A method for categorizing a handwritten test document comprising:

generating keyword models, comprising:

defining a taxonomy comprising a set of categories;

for each of the categories in the set of categories, extracting a set of discriminative words, from a training set of typed documents labeled by category, the extracting of the set of discriminative words including computing frequencies of words in the labeled typed documents and, based on the word frequencies, identifying words whose frequency of occurrence in typed documents labeled with the category differs from a frequency of occurrence in typed documents labeled with other categories or for all the categories;

for each keyword in a group of keywords, synthesizing a set of samples of the keyword with a plurality of different computer typographical fonts, wherein for each typographical font, each letter of the keyword is generated from a stored character set comprising letters of the alphabet, the keywords comprising at least one discriminative word for each category in the set of categories;

generating a keyword model for each keyword in the group, parameters of the model being estimated based on features extracted from the synthesized samples of that keyword;

computing keyword statistics for each of a set of scanned handwritten documents labeled by category by applying the generated keyword models for the group of keywords to word images extracted from the scanned handwritten documents, each keyword model outputting a probability of word images in the respective handwritten document matching the respective keyword, frequencies for each keyword being computed as a function of the probabilities, the statistics being based on the computed frequencies; and with a computer processor, training a handwritten document categorizer with the keyword statistics computed for the set of handwritten documents and the respective handwritten document labels;

computing keyword statistics for a handwritten test document by applying the generated keyword models to word images extracted from the handwritten test document; and with a computer processor, inputting the computed keyword statistics for the handwritten test document to the handwritten document categorizer, the categorizer assigning a category label from the set of categories to the handwritten test document based on the input keyword statistics for the handwritten test document.

14. The method of claim 13, further comprising:

implementing a computer implemented process for the test document based on the assigned category label.

15. The method of claim 13, wherein each synthesized typed sample comprises a computer-generated binary image of a fixed pixel height and wherein the extracted handwritten word images are normalized to the same fixed pixel height and are binary images.

16. A method for categorizing a handwritten test document comprising:

generating keyword models, comprising:

defining a taxonomy comprising a set of categories;

for each of the categories in the set of categories, extracting a set of discriminative words, from a training set of typed documents, each typed document including typed words and being labeled by category from the set of categories;

for each keyword in a group of keywords, synthesizing a set of samples of the keyword with a plurality of different computer typographical fonts, the keywords comprising at least one of the discriminative words for each category in the set of categories;

generating a keyword model for each keyword in the group, parameters of the model being estimated based on features extracted from the synthesized samples of that keyword;

computing keyword statistics for each of a set of scanned handwritten documents labeled by category by applying the generated keyword models for the group of keywords to word images extracted from the scanned handwritten documents, each keyword model outputting a probability of word images in the respective handwritten document matching the respective keyword, frequencies for each keyword being computed as a function of the probabilities, the statistics being based on the computed frequencies; and with a computer processor, training a handwritten document categorizer with the keyword statistics computed for the set of handwritten documents and the respective handwritten document labels;

computing keyword statistics for a handwritten test document by applying the generated keyword models to word images extracted from the handwritten test document; and with a computer processor, inputting the computed keyword statistics for the handwritten test document to the handwritten document categorizer, the categorizer assigning a category label corresponding to one of the categories to the handwritten test document based on the input keyword statistics for the handwritten test document.

17. An apparatus for training a handwritten document categorizer comprising:

memory which stores instructions for:

defining a taxonomy comprising a set of categories;

from a set of typed documents labeled by category, identifying, for each of the categories in the set of categories, a corresponding set of keywords which are discriminative for that category based on a frequency of occurrence of the keywords in the typed documents labeled with that category, including identifying words whose frequency of occurrence in the typed documents labeled with the category differs from a frequency of occurrence in typed documents labeled with other categories or for all the categories;

for each keyword in a group of keywords, synthesizing a set of computer-generated images using different computer typographic fonts, the group of keywords comprising keywords from each set of the keywords;

generating a keyword model for each keyword in the group of keywords based on features extracted from the synthesized images;

computing keyword statistics for each of a set of scanned handwritten documents labeled by category by applying the generated keyword models to word images extracted from the scanned handwritten documents, each keyword model outputting a probability of word images in the respective handwritten document matching the respective keyword, frequencies for each keyword being computed as a function of the probabilities, the statistics being based on the computed frequencies; and training a handwritten document categorizer with the keyword statistics computed for the set of handwritten documents and the respective handwritten document labels;

a processor in communication with the memory which executes the instructions; and a display and wherein the instructions include instructions for displaying a visual representation of one of the labeled handwritten documents with keywords identified in the document highlighted for verification by a reviewer.

18. The apparatus of claim 17, wherein each keyword model comprises a semi-continuous hidden Markov model.

19. An apparatus for training a handwritten document categorizer comprising: memory which stores instructions for:

defining a taxonomy comprising a set of categories; from a set of typed documents labeled by category, identifying, for each of the categories in the set of categories, a corresponding set of keywords which are discriminative for that category based on a frequency of occurrence of the keywords in the typed documents labeled with that category, including identifying words whose frequency of occurrence in the typed documents labeled with the category differs from a frequency of occurrence in typed documents labeled with other categories or for all the categories;

for each keyword in a group of keywords, synthesizing a set of computer-generated images using different computer typographic fonts, the group of keywords comprising keywords from each set of the keywords;

generating a keyword model for each keyword in the group of keywords based on features extracted from the synthesized images;

computing keyword statistics for each of a set of scanned handwritten documents labeled by category by applying the generated keyword models to word images extracted from the scanned handwritten documents, each keyword model outputting a probability of word images in the respective handwritten document matching the respective keyword, frequencies for each keyword being computed as a function of the probabilities, the statistics being based on the computed frequencies; and training a handwritten document categorizer with the keyword statistics computed for the set of handwritten documents and the respective handwritten document labels;

a processor in communication with the memory which executes the instructions; and a display and wherein the instructions include instructions for displaying a visual representation of one of the labeled handwritten documents with keywords identified in the document highlighted for verification by a reviewer.

20. A method for training a handwritten document categorizer comprising:

defining a taxonomy comprising a set of categories;

for each of the categories in the set of categories, extracting a set of discriminative words, from a training set of typed documents labeled by category from the set of categories, the extracting of the set of discriminative words including computing frequencies of words in the labeled typed documents and, based on the word frequencies, identifying words whose frequency of occurrence in typed documents labeled with the category differs from a frequency of occurrence in typed documents labeled with other categories or for all the categories;

for each keyword in a group of keywords, synthesizing a set of computer-generated samples of the keyword with a plurality of different type fonts, the keywords comprising at least one discriminative word for each category in the set of categories, wherein for each type font, each letter of the keyword is generated from a stored character set comprising letters of the alphabet;

generating a keyword model for each keyword in the group, parameters of the model being estimated based on features extracted from the synthesized samples of that keyword;

computing keyword statistics for each of a set of scanned handwritten documents, each of the documents being labeled by category selected from the set of categories, by applying the generated keyword models for the group of keywords to word images extracted from the scanned handwritten documents, the computing of the statistics for each scanned document including computing the number of occurrences of each keyword in the document, the statistics being based on the computed number of occurrences; and with a computer processor, training a handwritten document categorizer with the keyword statistics computed for the set of handwritten documents and the respective handwritten document labels.

21. The method of claim 20, wherein the computing of keyword statistics for each of the scanned handwritten documents includes computing the number of occurrences of each of the keywords in the respective scanned document.

22. The method of claim 20, wherein there are at least four of the categories.

23. The method of claim 20, wherein there are up to 20 of the categories.

* * * * *